UNITED STATES PATENT OFFICE 2,290,289

PHOTOGRAPHIC ELEMENT CONTAINING WATER SOLUBLE SALTS OF ALKYD RESINS AS DISPERSING AGENTS

David M. McQueen, Wilmington, Del., assignor, by mesne assignments, to E. I. du Pont de Nemours & Company, Wilmington, Del., a corporation of Delaware No Drawing. Application May 31, 1939,
Serial No. 276,718

15 Claims. (Cl. 95—6)

This invention relates to photographic emulsions containing novel dispersing agents and to processes for dispersing insoluble constituents in photographic emulsions. More particularly it relates to color photography and to light-sensitive gelatino-silver halide emulsions containing dyes, pigments, color-formers, dye-intermediates and other color-contributing agents, and novel dispersing agents therefor, and to methods of dispersing such compounds in emulsions.

This invention has for an object the production of photographic emulsions having uniformly dispersed therein substantially insoluble materials. A further object is the production of photographic gelatino-silver halide emulsions layers which have uniformly dispersed therethrough dyes or pigments, color-formers, dye intermediates, etc. which remain uniformly dispersed throughout manufacture and processing. A further object is to provide color photographs having dye-component images of improved clarity and color brilliance. Other objects will appear hereinafter.

In the field of color photography, one of the chief disadvantages which is particularly noticeable in multi-layer coatings is the fact that dyes, pigments, dye intermediates or color-formers, etc. tend to migrate from layer to layer. When insoluble materials or compounds are used in an effort to avoid this difficulty, it is found that the insoluble materials tend to deposit or crystallize out. Dispersing agents which have been proposed in this connection have in general been unsatisfactory because either the resulting dispersions were incompatible with the emulsion or the soluble dispersing agent tended to cause the solids to migrate from layer to layer or to leach out under the influence of processing baths.

The above and other objects have been accomplished and the aforedescribed disadvantages have been overcome by incorporating into a colloid emulsion layer especially a gelatino-silver halide emulsion, a dispersion of a substantially insoluble material having a use in photography in which the dispersing agent is a water-soluble salt of an alkyd resin.

In a more limited sense, they are accomplished by incorporating into a gelatin emulsion, especially a gelatino-silver halide emulsion, an aqueous dispersion of a dye or pigment or a dye intermediate or color-former in which the dispersing agent is a water-soluble salt of an alkyd resin.

The aqueous solution of the novel dispersing agents may be prepared by treating the alkyd or polyhydric alcohol-polycarboxylic acid resin with an aqueous solution of a water-soluble base which may be of organic or inorganic type. The dispersion of insoluble material may then be prepared by dissolving the insoluble compound in a suitable solvent and adding it with stirring to the water solution of the resin. In such cases, where a water-insoluble material is insoluble in other solvents, such as is often the case with pigments and dyes, the dispersion may be prepared by grinding the insoluble material in the presence of the aqueous solution of the resin salt.

In making the alkyd resin the polyhydric alcohol and polycarboxylic acid, with or without certain other ingredients known as modifying agents which are described more fully hereinafter are reacted according to the known methods. For instance, they may be fused at any suitable temperature above their mixed melting point which will produce resinification, usually in the range 150–250° C., the heating being discontinued before the infusible, insoluble stage is reached, and preferably when the resin has an acid number of 50 to 200. As is well known to those skilled in the art, this varies to a considerable extent, depending on such factors as the nature of the polyhydric alcohol and polycarboxylic acid, number of hydroxyl and carboxyl groups, the nature and amount of any monovalent modifying agents and fatty oils (or other esters) present, the temperatures employed, the exact variations from stoichiometrical proportions of ingredients, etc. Resins capable of forming water-soluble salts have a relatively high acid number. The exact value of this acid number varies with the nature of the resin, the ratio of reactants employed, conditions of preparation, etc., but is usually in the range of 50–200.

The step of preparing the aqueous solution of this resin is preferably carried out while the resin is still molten, say at 100–150°, C., or occasionally even higher. The resin may, however, be first allowed to cool, then pulverized and stirred with the water solution of the basic material at ordinary or elevated temperatures. The amount of water solution of the base to be added will be as a rule slightly more than that calculated from the acid value of the resin to give a basic solution. This can be checked by adding a sufficient amount to cause the resulting solution to be faintly basic towards litmus. The solutions are relatively stable, but in certain cases, because of the volatility of the base and/or the relatively loose chemical combination of the high acid resin therewith, the resin may show a tendency to precipitate when the solution is allowed to stand for a long time. When this occurs the resin is readily redissolved by adding more of the base with stirring.

Resins A, B, C, and D and soluble salts thereof suitable for practical use in carrying out this invention may be made as follows:

Resin—A

| Reactants | Parts by weight |
| --- | --- |
| Glycerol | 22.82 |
| Phthalic anhydride | 53.94 |
| Raw castor oil | 23.24 |

The above ingredients are brought to a temperature of 200° C. over a period of one hour in an open vessel, accompanied by stirring and are held at this temperature for two hours. The resin is then allowed to cool, is solidified and pulverized and stirred into an aqueous solution of ammonia. A slight excess of ammonia over that calculated from the acid number of 98 is required to obtain a clear solution.

Resin—B

| Reactants | Parts by weight |
| --- | --- |
| Cottonseed oil | 23.24 |
| Glycerol | 20.50 |
| Phthalic anhydride | 53.92 |

The mixture of cottonseed oil and glycerol in an open vessel to which is added 0.1 part sodium hydroxide, is brought to a temperature of 250° C. over a period of one hour, and is then held at this point for twenty minutes. The phthalic anhydride is added and the mass heated and stirred for 1⅓ hours at 200° C. A soft light-colored resin of acid number 117 is obtained. Heating is discontinued and the temperature allowed to fall to 125° C. This resin while still molten is dissolved in slightly more than the stoichiometrical amount of sodium hydroxide in 500 parts of water. A clear solution is readily obtained.

Resin—C

| Reactants | Parts by weight |
| --- | --- |
| Glycerol | 26.76 |
| Phthalic anhydride | 70.27 |

The above ingredients are carried to a temperature of 200° C. over a period of one hour in an open vessel, accompanied by stirring, and the reaction mixture is then held at this point for an additional hour. This product shows an acid value of 155. Heating is then discontinued and the temperature is allowed to fall to 150° C. Twenty-five parts of this mixture, cooled to 125° C. is dissolved in 4.4 parts of 28% ammonia, previously diluted with 70.6 parts of water, preferably by adding the diluted ammonia to the resin. A clear solution having a basic reaction to litmus and of good keeping properties is obtained.

Resin—D

| Reactants | Parts by weight |
| --- | --- |
| Ethylene glycol | 7.41 |
| Glycerol | 20.29 |
| Adipic acid | 70.04 |

The above ingredients are carried to 200° C. over a period of one hour in an open vessel, the temperature being maintained at this point for an additional hour, or until the acid number reaches 150–155. After cooling to room temperature, 24.44 parts of this product is dissolved in 1.23 parts of sodium hydroxide previously dissolved in 150 parts of water.

The invention will be further illustrated, but is not intended to be limited by the following examples in which the parts stated are parts by weight.

EXAMPLE I

Twelve parts of the mono-n-octadecyl ether of resorcinol is dissolved in 320 parts of 95% ethanol and to this solution is added 50 parts of a 20% aqueous ammonia solution of Resin—A. The resulting homogeneous solution is then added to 1100 parts of a panchromatic negative type gelatino-silver halide emulsion, and the resulting mixture is coated on cellulose nitrate film base, preferably provided with an emulsion anchoring or subbing layer. The resulting film is leached in 5% sodium carbonate solution for ½ hour. Following this treatment the film is exposed and developed with p-aminodiethylaniline, bleached with 4% potassium ferricyanide solution and fixed. The film then shows a bright clear haze-free blue-green color in the exposed portions. It is observed that none of the resorcinol mono-n-octadecyl ether is removed by the sodium carbonate. A similar emulsion in which sulfated castor oil was used as the dispersing agent is observed to lose a considerable portion of the long-chain monoether when treated with 5% sodium carbonate solution in the same manner.

EXAMPLE II

Eight parts of the mono-n-dodecyl ether of resorcinol is dissolved in 320 parts 95% ethanol. This is then added to 50 parts of a 10% aqueous solution of the triethanolamine salt of the cottonseed oil-modified glycerol-phthalic anhydride resin of Resin—B. The homogeneous solution is stirred into 1100 parts of a panchromatic emulsion. The dispersion is smooth and uniform and is coated on cellulose acetate film base.

After exposing, developing with p-aminodimethylaniline, bleaching and fixing, the resulting film is found to have a blue-green image, uniform in appearance and without an indication of crystallization.

EXAMPLE III

One part of the stearic amide of 1-(m-aminophenyl)-3-methyl-5-pyrazolone is dissolved in 30 cc. of ethanol containing 0.3 part of an alkali-soluble alkyd resin prepared from the following ingredients: coconut oil 61.20 parts, diethylene glycol 15.50 parts, glycerol 0.90 part, phthalic anhydride 22.40 parts, in a manner similar to Resin—A. The resulting homogeneous solution is stirred into 110 grams of orthochromatic photographic emulsion. During the addition to the alkaline emulsion the resin is transformed into its alkali metal salt and the water-soluble salt retains the water-insoluble pyrazolone in a state of fine dispersion. The resulting film, after uniform exposure, upon development with p-aminodiethylaniline, followed by bleaching and fixing, gives a uniformly colored transparent film, magenta in shade.

EXAMPLE IV

A 10% solution of the potassium salt of Resin—D disclosed above is prepared. To 50 cc.

of this solution 5 grams of Prussian blue is added with good stirring. The dispersion thus obtained was further homogenized by passage through a colloid mill. This is added to 500 grams of photographic emulsion and coated upon cellulose nitrate film base. The resulting film after drying is observed to be completely uniform and to contain no trace of coarse pigment when observed under a microscope.

The alkyd resins which form the dispersing agents contemplated in the invention may be made from any of the polyhydric alcohols and resinifying carboxylic acids known in the art of manufacturing resins of this type. These include alcohols such as glycerol, ethylene glycol, diethylene glycol, pentaerythritol, sorbitol, polyglycerol, and ethers of polyhydric alcohols still containing at least two alcohol groups, such as glycerol monobenzyl ether and the diethyl ether of pentaerythritol. In addition to phthalic anhydride and adipic acid, there may be used such polycarboxylic acids as succinic, sebacic, fumaric, tartaric, citric, salicylacetic, hexahydrophthalic, malic, naphthalic and maleic acids. Mixtures of polyhydric alcohols and/or mixtures of polycarboxylic acids are often desirable. The usual modifying agents, such as drying oil acids, rosin and monocarboxylic acids in general as well as monohydric alcohols such as butyl alcohol, benzyl alcohol, β-ethoxyethanol, cyclohexanol, etc., may be used as additional resin ingredients. Other suitable ester modifying agents, in addition to the cottonseed oil, coconut oil and castor oil disclosed in the examples, include such esters as linseed oil, China-wood oil, perilla oil, soya bean oil, rosin glyceride, stearin and dibutylphthalate. The term alkyd resin covers not only the acid-alcohol condensation products, but also the modified resins.

Any alkaline material which leads to the production of a water-soluble salt of the resins contemplated in this invention may be used. Inorganic bases, e. g. alkali metal or ammonium hydroxides, carbonates or phosphates, and organic bases such as primary, secondary, and tertiary aliphatic, cycloaliphatic, aromatic and heterocyclic amines including mixed amines of the types specified, e. g. alkylarylamines, aralkyl, etc. As examples of specific amines mention is made of methylamine, diethylamine, butylamine, cyclohexylamine, diethylcyclohexylamine, tetraethylammonium hydroxide, triethanolamine, trimethylamine, ethylenediamine, etc. are suitable. Mixtures of the above salts may be used. Furthermore, the resins may be dissolved in some suitable solvent, e. g., ethanol, acetone and then added to an aqueous alkaline medium as disclosed in Example VII.

The amount of resin used may vary widely depending upon the particular material to be dispersed and the photographic emulsion. From ½ to 2 parts of resin per part of color former etc. and 1 to 5 parts of the latter per 1000 parts of emulsion represent a practical range.

As hereinbefore mentioned, the dispersions of the substantially water-insoluble materials may be prepared in any known manner, for example, by grinding the material in a solution of the resin salt, by addition of a solution of the material to a solution of the resin salt or by solution of the material and the resin in a common solvent followed by addition to an alkaline aqueous medium. High speed stirrers, homogenizers and colloid mills may be advantageously used to assist dispersion. As used here and throughout the specification, the term "dispersion" refers to dispersions of both solids and liquids or mixtures of one or both.

The water-soluble salts of the alkyd resins have a great many advantages in photographic compositions. They have great utility for preparing uniform dispersions of finely divided insoluble photographic emulsion addition materials such as pigments, dyes, dye intermediates, color-formers, etc. with the silver halide emulsions and with the gelatine or other water-permeable intermediate layers found particularly in multilayer films for color photography. Thus, these dispersing agents provide an excellent means for preparing the intermediate yellow filter layers by dispersing, for example, titanium ferrocyanide in a gelatine solution. In addition, by the use of the salts of these alkyd resins, it is possible to prepare uniform coatings of silver halide emulsions containing the leuco-forms of particularly indanthrene and anthraquinone dyes, converting the dyestuffs to dye images simultaneously with the oxidizing of the silver image.

The dispersing agents hereof may be used for incorporating bleach out dyes in emulsion layers of photographic film. For instance, the water-insoluble non-diffusing compounds formed by the addition of quaternary salts of a substantially colorless organic base and an acid dyestuff as described in U. S. Patent 2,075,190, and the substantially insoluble salts of colorless nitrogenous organic bases and an acid dyetsuff described in U. S. Patent 2,046,067 may be dispersed in emulsion layers by the dispersing agents hereof in a similar manner.

The dispersing agents described herein may be incorporated in emulsion materials composed of various colloids such as gelatin, gum arabic or albumin. Their use furthermore is not restricted to silver halide sensitized layers, but may be used in any colloid emulsion capable of sensitization, e. g. layers sensitized by treatment with bichromate. The emulsion layers as aforesaid need not be light-sensitive, but may be gelatin layers having insoluble screening dyes dispersed therein with the described agents.

The invention furthermore is not limited to the specific types of color formers above described. On the contrary, any immobile color forming compound can be similarly dispersed. For example, the pyridinium color formers of U. S. Patent 2,154,918, the insoluble aceto acetamides of U. S. Patent 2,108,602, and many other types of immobile color-formers of high molecular weight containing insolubilizing groups may be dispersed in a like manner.

The water-soluble salts of alkyd resins possess two very definite advantages over other dispersing agents for use in conjunction with silver halide-gelatin emulsions. First, the resin salts are compatible with gelatino-silver halide emulsions and this compatibility is not destroyed by treatment of the films with baths encountered in the usual processing of photographic films. Second, the resin salts do not make the dispersed materials bleed out of the film. The latter property is of particular interest in processes of color photography wherein a leaching of the dye intermediates by the processing baths would lead to weakened and distorted color values.

A further and decidedly unexpected result of the use of water-soluble salts of alkyl resins lies in the production of harder emulsions. This manifests itself particularly where chrome alum, or other salt of a polyvalent metal, is used to harden the gelatin. Its hardening action is apparently due to the fact that the polyvalent metallic ion reacts with the water soluble salt of the resin to form a water-resistant compound.

As many apparently widely different embodiments of this invention may be made without departing from the spirit and scope thereof, it is to be understood that I do not limit myself to the specific embodiments hereof except as defined by the claims.

I claim:

1. A photographic element comprising a base member and a light sensitive material bearing at least one layer comprising a finely divided substantially water-insoluble photographic emulsion color contributing material taken from the group consisting of pigments, dyes and color formers and a water-soluble salt of an alkyd resin.

2. A photographic element comprising a base member and a light sensitive material bearing at least one layer comprising a finely divided solid substantially water-insoluble color-contributing material taken from the group consisting of pigments, dyes and color formers and an alkali metal salt of an alkyd resin.

3. A photographic element comprising a base bearing a plurality of emulsions each comprising a colloid binding agent containing a dispersion comprising a finely divided water-insoluble color-contributing material taken from the group consisting of pigments, dyes and color formers and a water-soluble salt of an alkyd resin and a light sensitive material.

4. A photographic gelatino-silver halide emulsion containing a finely divided solid water-insoluble color-contributing material taken from the group consisting of pigments, dyes and color formers and an alkali metal salt of an alkyd resin.

5. A photographic gelatino-silver halide emulsion layer containing a finely divided substantially water insoluble color-former, and a water-soluble salt of an alkyd resin.

6. A photographic element bearing at least one gelatino-silver halide emulsion layer containing a uniform dispersion of a finely divided substantially water-insoluble color-former with a dispersing agent comprising an alkali metal salt of an alkyd resin.

7. In a process of manufacturing photographic silver halide emulsion, the step which comprises adding to a mixture containing a light sensitive silver salt and a binding agent, an aqueous dispersion of a water-soluble salt of an alkyd resin and a finely divided substantially water-insoluble solid photographic emulsion color contributing material taken from the group consisting of pigments, dyes and color formers.

8. In a process of manufacturing photographic gelatino-silver halide emulsions the step which comprises adding to a mixture containing silver halide and gelatin, an aqueous alkaline dispersion of a water-soluble salt of an alkyd resin and a finely divided substantially water-insoluble color-former.

9. A photographic element comprising a base member bearing a plurality of gelatino-silver halide emulsion layers each containing a uniform dispersion of a finely divided substantially water-insoluble color-former with a dispersing agent comprising an alkali metal salt of an alkyd resin.

10. A photographic film element comprising a transparent base bearing a plurality of gelatino-silver halide emulsion layers each containing a uniform dispersion of a finely divided substantially water-insoluble color-former with a dispersing agent comprising an alkali metal salt of an alkyd resin.

11. A photographic element bearing at least one light sensitive silver halide emulsion layer containing a uniform dispersion of a finely divided substantially water-insoluble color-former with a dispersing agent comprising an alkali metal salt of an alkyd resin, said color former being present in an amount of from 1 to 5 parts per 1000 parts of emulsion and the resin in an amount of ½ to 2 parts per part of color former.

12. An element as set forth in claim 11 wherein said resin has an acid number of 50 to 200.

13. A photographic element bearing at least one light sensitive gelatino silver halide emulsion layer containing a uniform dispersion of a finely divided substantially water-insoluble color-former with a dispering agent comprising an alkali metal salt of an alkyd resin, said color former being present in an amount of from 1 to 5 parts per 1000 parts of emulsion and the resin in an amount of ½ to 2 parts per part of color former.

14. A photographic element bearing at least one light sensitive gelatino silver halide emulsion layer containing a uniform dispersion of a finely divided substantially water-insoluble color-former with a dispersing agent comprising an alkali metal salt of an alkyd resin, said color former being present in an amount of from 1 to 5 parts per 1000 parts of emulsion and the resin in an amount of ½ to 2 parts per part of color former, said emulsion layer containing a polyvalent metal salt gelatin hardening agent.

15. A photographic element bearing at least one silver halide emulsion layer composed of a colloid having dispersed therein a finely divided solid substantially water insoluble color contributing material taken from the group consisting of pigments, dyes and color formers, by means of a water soluble salt of an alkyd resin having an acid number of 50 to 200.

DAVID M. McQUEEN.